Aug. 25, 1925.
H. BARNOWITZ
CLASP
Filed March 13, 1925
1,551,455
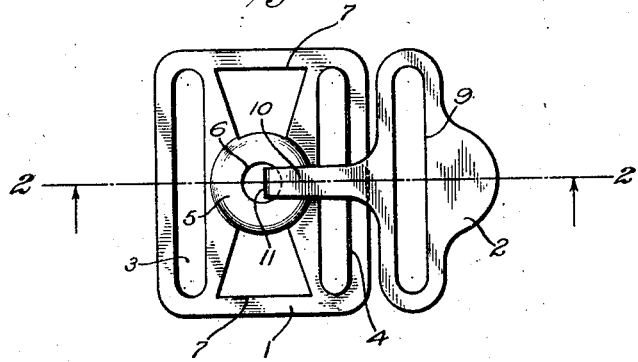
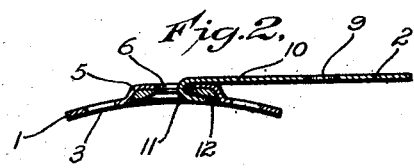
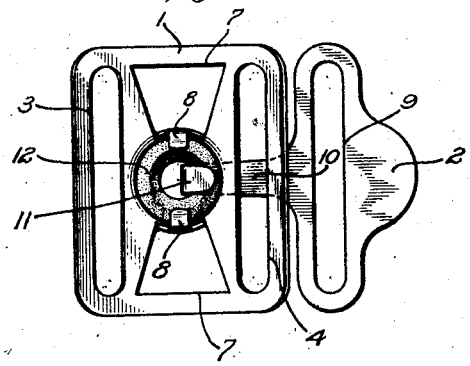
WITNESSES
INVENTOR
HARRY BARNOWITZ
BY
ATTORNEYS Patented Aug. 25, 1925.

1,551,455

UNITED STATES PATENT OFFICE.

HARRY BARNOWITZ, OF BROOKLYN, NEW YORK.

CLASP.

Application filed March 13, 1925. Serial No. 15,298.

*To all whom it may concern:*

Be it known that I, HARRY BARNOWITZ, a citizen of the United States, and a resident of the city of New York (borough of Brooklyn), in the county of Kings and State of New York, have invented a new and Improved Clasp, of which the following is a full, clear, and exact description.

This invention relates to clasps and more particularly to a clasp designed for use in connection with garters, belts or other similar articles, an object of the invention being to provide a clasp including a socket member and a hook member, the socket member containing an elastic ring constituting, in effect, an annular wedge which is gripped by the hook when the latter is properly engaged in the socket member so as to hold the hook against accidental displacement, prevent noise of contact, and insure a firm, secure coupling.

A further object is to provide a clasp of this character which can be manufactured and sold at a reasonably low price, which will be ornamental and attractive in appearance, and which will most efficiently perform the functions for which it is intended.

With these and other objects in view, the invention consists in certain novel features of construction and combinations and arrangements of parts, which will be more fully hereinafter described and pointed out in the claims.

In the accompanying drawings—

Figure 1 is a plan view of my improved clasp;

Figure 2 is a view in longitudinal section on the line 2—2 of Figure 1;

Figure 3 is an inverted plan view of the clasp shown in Figure 1.

My improved clasp comprises a socket member 1 and a hook member 2. The socket member 1 is formed from a metal plate which is slightly bowed longitudinally, and which is formed with slots 3 and 4 adjacent its respective ends for the reception of the material to which the member is to be attached.

The member 1 at its center is formed with a circular offset portion 5 having a central circular opening 6 therein. At both sides of the offset portion the metal of the member 1 is cut out, as shown at 7, for lightness and for ornamentation, and at the sides of the offset portion integral tongues 8 are formed for a purpose which will hereinafter appear.

The hook member 2 has a slot 9 therein for the reception of the material to which the hook member is attached and this member 2 has a narrow tongue 10, the extremity of which is bent, forming a hook 11 of a width to pass freely through the opening 6, so as to couple the members together.

In the laterally offset portion 5 of member 1 I locate a ring 12 which is preferably of rubber although it may be made of other flexible resilient material. This ring 12 fits the offset portion and its central opening registers with the opening 6 or is slightly larger than the opening 6 so that the ring is entirely hid from view.

I would call particular attention to the shape of this ring in transverse section, as indicated clearly in Figure 2. It will be noted that the ring is narrowest or thinnest adjacent its central opening and increases in thickness toward its outer edge so that every portion of the annular ring constitutes in effect a resilient flexible wedge so that when the hook 11 is positioned through the opening 6 and drawn rearwardly the ring exerts a resilient wedging action under the hook so as to prevent possibility of accidental disconnection of the hook, to bind the hook and to offer resistance to its movement which might cause noise as well as tend to uncouple the parts. In other words, the rubber ring is not only a securing means but it is also a cushioning and a noise preventing means, and this is very important especially when the device is used in connection with a garter or like device as it prevents any metallic sound due to the movement of the coupled members. Furthermore, the device insures a secure coupling and presents an ornamental and attractive appearance.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. A clasp, comprising a socket member and a hook member, the socket member comprising a plate having a laterally offset portion with a hook receiving opening therein, integral lugs at the edges of the offset portion, a flexible ring in the offset portion and secured therein by bending the lugs inwardly thereagainst, and a hook member adapted to be projected through the opening of the offset portion and engage the ring.

2. A clasp, comprising a socket member and a hook member, the socket member comprising a plate having a laterally offset portion with a hook receiving opening therein, integral lugs at the edges of the offset portion, a flexible ring in the offset portion and secured therein by bending the lugs inwardly thereagainst, and a hook member adapted to be projected through the opening of the offset portion and engage the ring, said ring thinnest at its central portion and increasing in thickness toward its outer edge whereby the ring exerts a wedging action between the hook and the under face of the offset portion of the plate.

HARRY BARNOWITZ.